Oct. 3, 1944.   W. OCHSENBEIN   2,359,438
IMPULSE COUPLING
Filed April 21, 1942
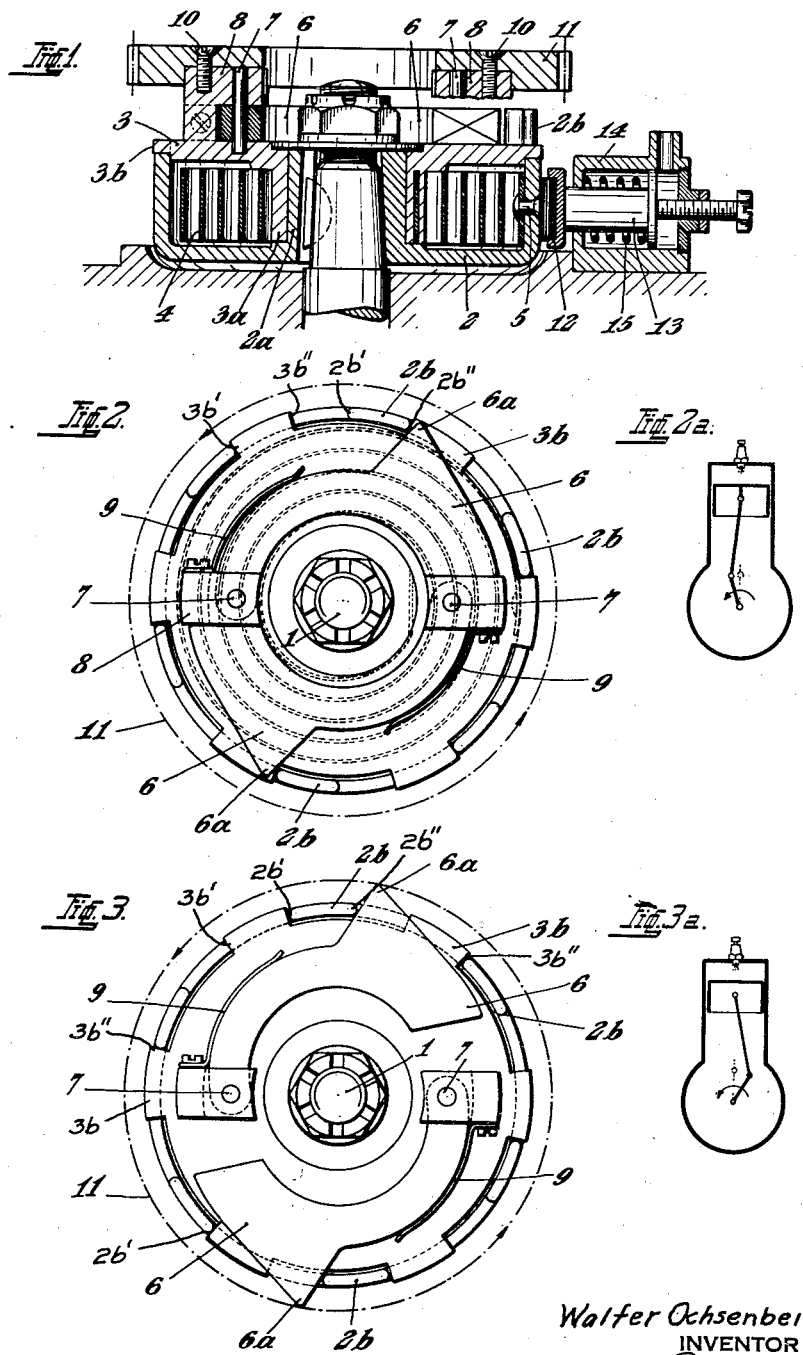
Walter Ochsenbein
INVENTOR
BY
ATTORNEY.

Patented Oct. 3, 1944

2,359,438

UNITED STATES PATENT OFFICE 2,359,438

IMPULSE COUPLING

Walter Ochsenbein, Berne, Switzerland, assignor to Hasler A.-G. Werke für Telephonie und Präzisionsmechanik, Berne, Switzerland Application April 21, 1942, Serial No. 439,877
In Switzerland January 3, 1941

3 Claims. (Cl. 171—209)

The present invention relates to an impulse coupling for magnetos of internal combustion engines.

One object of the invention is to provide, in an impulse coupling without pawls or dogs, means to vary the torque of the coupling portions relative to each other for the purpose of advancing or retarding the ignition timing.

Another object of the invention is to provide means whereby the relative torque of the coupling portions is automatically varied in dependence upon the speed of the engine.

Still another object of the invention is to provide means for varying the relative torque of the coupling portions by a brake mechanism which may be automatic or operator controlled.

These and other objects are accomplished according to the present invention by means of the arrangement and combination of elements set forth in the following description, defined in the appended claims and illustratively exemplified in the accompanying drawing in which:

Fig. 1 is an axial section of an impulse coupling according to the invention;

Fig. 2 is a plan view of the coupling according to Fig. 1, under omission of the driving gear, showing the two coupling portions in one predetermined angular position relative to each other;

Fig. 2a is a diagrammatic view of an engine cylinder and piston illustrating the ignition timing when the coupling portions assume the relative positions according to Fig. 2;

Fig. 3 is a plan view similar to that of Fig. 2 showing the two coupling portions in a second predetermined angular position relative to each other; and Fig. 3a is an engine diagram showing the ignition timing when the coupling portions assume their relative positions according to Fig. 3.

A cuplike coupling portion 2 is keyed to the shaft 1 of a not represented multipole magneto of known construction. Into this coupling portion the second coupling portion 3 is inserted as a cover. The portion 3 is rotatably seated with its hub 3a upon the hub 2a of the portion 2. Both portions 2 and 3 together form a casing for a spiral spring 4, the inner end of which is connected to the hub 3a of the coupling portion 3 while its outer end is connected to the inner peripheral wall surface of the coupling portion 2 by means of a rivet. The cylindrical flange of the coupling portion 2 is provided with upstanding projections 2b and the coupling portion 3 is provided with radial projections 3b meshing with some play with the projections 2b, so that the two coupling portions may be mutually displaced in an angular relation to a predetermined extent. The spiral spring 4 has a certain initial tension according to the size of the magneto so that at rest the teeth 2b abut with their forward edges 2b' against the rear edges 3b'' as is shown in Fig. 3 representing the coupling portions in the position of an early ignition. Two centrifugal weights 6 are mounted on the coupling portion 3 each swingable about a vertical pivot 7 which is inserted into the coupling portion 3 and is held, at its upper end, in a bracket 8 integral with said coupling portion 3. Each centrifugal weight is bent at a semicircle and urged by a spring 9 attached to the corresponding bracket 8 into an inner position in which its free end rests against the other bracket 8. Each centrifugal weight 6 projects with a wedge-shaped tooth 6a into the path of one of the teeth 2b and makes contact with the rear edge 2b'' of such tooth. By means of screws 10 a gear wheel 11 is secured to the brackets 8 to be geared at a suitable ratio to the crank shaft of an internal combustion engine for rotation in the direction of the arrows in Figs. 2 and 3.

At the starting of the motor the coupling portion 3 will be rotated in a counter-clockwise direction, but the portion 2 is locked in place by the attraction of the multipole magneto so that the tension of spring 4 is increased. Only when the front edges 3b' of the teeth 3b touch the rear edges 2b'' of the teeth 2b, as shown in Fig. 2, the coupling portion 2 will be rotated by overcoming the increasing torque of the magnetic field.

Having surpassed the maximum value of the torque the rotor will receive a rotary movement by the magnetic field, which movement will be supported or be accelerated by the spring 4 to a value adapted to generate a first ignition spark. With increasing engine speed the influence of the torque upon the armature becomes smaller on account of the shortened efficiency periods. The spiral spring 4 therefore causes the two coupling portions 2 and 3 at increasing speed (without the support of the centrifugal weights) to assume after each spark instead of the relative positions shown in Fig. 2 which corresponds to late ignition, relative positions which approximate more and more those of Fig. 3, corresponding to early ignition. The springs 9 are so chosen, that the centrifugal weights are moved outwards only at a certain speed. Then they will operate with their teeth 6a upon the teeth 2b coming into their path between the teeth 3b and will force the two coupling portions 2 and 3 permanently into the relative positions shown in Fig. 3 whereby an automatic advance of the ignition point is obtained. The centrifugal weights, however, have the following additional effect. Due to the continuously changing resistance of the rotor in the magnetic field it is possible that the two coupling portions, when the teeth 3b are not in contact with the teeth 2b, will be hunting mutually during the transition from the late ignition position into the early ignition position whereby also a corresponding hunting displacement of the timing of the ignition would be produced. As soon, however, as the centrifugal weights execute a small movement from the inner final position, they will touch with their teeth 6a the respective teeth 2b and create a resistance against a torque of the coupling portions in the direction of late ignition. The movement of the coupling portion 2 between its end positions in relation to the coupling portion 3 will be dampened to some extent the timing of the ignition will be stabilised.

In the positions of the centrifugal weights shown in the Figs. 2 and 3 the weights 6 when moved outwards by the effect of the centrifugal force will have the effect to assist the spring 4 in its tendency to cause an early timing. In some cases, however, it may be desirable to use centrifugal weights of the type described for the purpose of retarding the ignition. In order to obtain this it will suffice to arrange the centrifugal weights with an angular displacement of 180° so that they are then located on the opposite sides of the brackets 8 so that under the effect of the centrifugal force they will come to touch with their teeth 6a the front edges 2b' of the corresponding teeth 2b. In this case by choosing the springs 9 accordingly the weights will have an effect opposed to that of spring 4, whereby the obtaining of the earliest ignition will become retarded.

For certain purposes, it is desirable to produce a late ignition even at high engine speeds. In order to render this possible with the described impulse coupling a brake head 12 supported in reach of the outer flange surface of the coupling portion 2 by a piston 13 has been provided for. The piston 13 is fitted slidably into a cylinder 14 and is held by a spring 15 in a position in which the brake is without any effect. The brake cylinder may be supplied with any kind of pressure means in order to bring the brake head into operation upon the coupling portion 2 either automatically or under control of the operator, producing thereby late ignition. By breaking the coupling portion 2 a torque of this portion in relation to portion 3 will be produced against the effect of the spiral spring 4 in the direction of a late timing of the ignition. Therefore the means are given to produce by means of the brake at full charge or at partial charge any desired timing of the ignition in order to obtain a higher output of the motor.

What I claim is:

1. An impulse coupling for the magneto of an internal combustion engine comprising a first coupling portion adapted to be keyed to the rotor of the magneto, a second coupling portion disposed coaxially with and rotatable relative to said first coupling portion, means for gearing said second coupling portion to the engine shaft, a spring cooperating with said two coupling portions so as to urge the same into a predetermined angular position relative to each other, cooperating abutments on said coupling portions to limit angular displacements of said portions relative to each other against the action of said spring, and means for varying the torque between said portions to alter the ignition timing including centrifugal weights movably attached to one of said coupling portions and arranged for cooperation with said abutments on said other coupling portion to govern the angular displacement of said first portion relative to said second portion at increasing engine speeds.

2. An impulse coupling, as claimed in claim 1, in which said centrifugal weights carry wedge-shaped teeth for cooperation with said other coupling portion.

3. An impulse coupling, as claimed in claim 1, including operator controlled brake means for retarding said first coupling portion with respect to said second coupling portion so as to counteract the tendency of said centrifugal weights to cause an angular advancement of said first coupling portion relative to said second coupling portion at increasing engine speeds.

WALTER OCHSENBEIN.